(12) United States Patent
Fleischer et al.

(10) Patent No.: US 7,559,977 B2
(45) Date of Patent: Jul. 14, 2009

(54) PURIFICATION WORKS FOR THERMAL POWER PLANT

(75) Inventors: Henrik Fleischer, Slependen (NO); Tor Christensen, Sandefjord (NO); Knut Borseth, Tårnåsen (NO)

(73) Assignee: Sargas AS, Oslo (NO)

( * ) Notice: Subject to any disclaimer, the term of this patent is extended or adjusted under 35 U.S.C. 154(b) by 421 days.

(21) Appl. No.: 10/577,923

(22) PCT Filed: Nov. 5, 2004

(86) PCT No.: PCT/NO2004/000336

§ 371 (c)(1),
(2), (4) Date: Jun. 6, 2006

(87) PCT Pub. No.: WO2005/045316

PCT Pub. Date: May 19, 2005

(65) Prior Publication Data

US 2007/0006565 A1   Jan. 11, 2007

(30) Foreign Application Priority Data

Nov. 6, 2003   (NO) .................................. 20034941

(51) Int. Cl.
  *F23J 15/04* (2006.01)
  *F01K 23/08* (2006.01)
(52) U.S. Cl. .................. 95/236; 110/215; 110/345; 60/39.12; 60/39.5; 60/772
(58) Field of Classification Search .............. 95/187, 95/236; 96/234, 243; 55/DIG. 30; 423/220, 423/228, 229; 110/203, 215, 345; 60/39.12, 60/39.182, 39.5, 39.52, 772, 783, 784
See application file for complete search history.

(56) References Cited

U.S. PATENT DOCUMENTS

| | | | |
|---|---|---|---|
| 4,434,613 | A | 3/1984 | Stahl et al. |
| 4,498,289 | A | 2/1985 | Osgerby et al. |
| 4,899,544 | A | 2/1990 | Boyd et al. |

(Continued)

FOREIGN PATENT DOCUMENTS

GB   2 097 476 A   11/1982

(Continued)

OTHER PUBLICATIONS

Goettlicher, VGB Powertech, VGB Kraftwerstechnik GMBH, Essen, DE, vol. 83, No. 5, 2003, pp. 96-101.

*Primary Examiner*—Frank M Lawrence
(74) *Attorney, Agent, or Firm*—Birch, Stewart, Kolasch & Birch, LLP

(57) ABSTRACT

A method for separation of $CO_2$ from the combustion gas from a thermal power plant fired with fossil fuel, wherein the combustion gas from the thermal power plant is used as cooled, compressed and reheated by combustion of natural gas in a combustion chamber to form an exhaust gas, where the exhaust gas is cooled an brought in contact with an absorbent absorbing $CO_2$ from the exhaust gas to form a low $CO_2$ stream and an absorbent with absorbed $CO_2$, and where the low $CO_2$ stream is heated by means of heat exchanges against the hot exhaust gas leaving the combustion chamber before it is expanded in turbines, is described. A plant for performing the method and a combined plant is also described.

4 Claims, 7 Drawing Sheets

U.S. PATENT DOCUMENTS

| | | | |
|---|---|---|---|
| 5,344,627 A * | 9/1994 | Fujii et al. | 423/220 |
| 5,875,722 A | 3/1999 | Gosselin, Jr. et al. | |
| 6,029,588 A | 2/2000 | Baudhuin et al. | |
| 7,022,168 B2 * | 4/2006 | Schimkat et al. | 96/125 |
| 7,328,581 B2 * | 2/2008 | Christensen et al. | 60/783 |

FOREIGN PATENT DOCUMENTS

| | | |
|---|---|---|
| WO | WO-00/57990 A | 10/2000 |
| WO | WO-01/90548 A | 11/2001 |
| WO | WO-04/001301 A | 12/2003 |
| WO | WO-2004/026445 A | 4/2004 |

* cited by examiner

PURIFICATION WORKS FOR THERMAL POWER PLANT

FIELD OF THE INVENTION

The present invention relates to a method for separation of the combustion gas from a thermal power plant fired by a fossil fuel into a $CO_2$ rich and a $CO_2$ poor stream, a separation plant for performing the method and a combined plant comprising a thermal power plant fired by a fossil fuel and the present separation plant.

BACKGROUND OF THE INVENTION

The concentration of $CO_2$ in the atmosphere has increased by nearly 30% in the last 150 years. The concentration of methane has doubled and the concentration of nitrogen oxides has increased by about 15%. This has increased the atmospheric greenhouse effect, something which has resulted in:

The mean temperature near the earth's surface has increased by about 0.5° C. over the last one hundred years, with an accelerating trend in the last ten years.
Over the same period rainfall has increased by about 1%
The sea level has increased by 15 to 20 cm due to melting of glaciers and because water expands when heated up.

Increasing discharges of greenhouse gases is expected to give continued changes in the climate. Temperature can increase by as much as 0.6 to 2.5° C. over the coming 50 years. Within the scientific community, it is generally agreed that increasing use of fossil fuels, with exponentially increasing discharges of $CO_2$, has altered the natural $CO_2$ balance in nature and is therefore the direct reason for this development.

It is important that action is taken immediately to stabilize the $CO_2$ content of the atmosphere. This can be achieved if $CO_2$ generated in a thermal power plant is collected and deposited safely. It is assumed that the collection represents three quarters of the total costs for the control of $CO_2$ discharges to the atmosphere.

Thus, an energy efficient, cost efficient, robust and simple method for removal of a substantial part of $CO_2$ from the discharge gas will be desirable to ease this situation. It will be a great advantage if the method can be realized in the near future without long-term research.

Discharge gas from thermal power plants typically contains 4 to 10% by volume of $CO_2$, where the lowest values are typical for gas turbines, while the highest values are only reached in combustion chambers with cooling, for example, in production of steam.

There are three opportunities for stabilizing the $CO_2$ content in the atmosphere. In addition to the capturing of $CO_2$, non-polluting energy sources such as biomass can be used, or very efficient power plants can be developed. The capturing of $CO_2$ is the most cost efficient. Still, relatively little development work is carried out to capture $CO_2$, the methods presented up till now are characterized either by low efficiency or by a need for much long-term and expensive development. All methods for capturing $CO_2$ comprise one or more of the following principles:

Absorption of $CO_2$. The exhaust gas from the combustion is brought into contact with an amine solution, at near atmospheric pressure. Some of the $CO_2$ is absorbed in the amine solution which is then regenerated by heating. The main problem with this technology is that one operates with a low partial pressure of $CO_2$, typically 0.04 bar, in the gas which shall be cleaned. The energy consumption becomes very high (about 3 times higher than if it is cleaned with a $CO_2$ partial pressure of 1.5 bar). The cleaning plant becomes expensive and the degree of cleaning and size of the power plant are limiting factors. Therefore, the development work is concentrated on increasing the partial pressure of $CO_2$. An alternative is that the exhaust gas is cooled down and re-circulated over the gas turbine. The effect of this is very limited due to the properties of the turbine, among other things. Another alternative is that the exhaust gas which is to be cooled down, is compressed, cooled down again, cleaned with, for example, an amine solution, heated up and expanded in a secondary gas turbine which drives the secondary compressor. In this way, the partial pressure of $CO_2$ is raised, for example to 0.5 bar, and the cleaning becomes more efficient. An essential disadvantage is that the partial pressure of oxygen in the gas also becomes high, for example 1.5 bar, while amines typically degrade quickly at oxygen partial pressures above about 0.2 bar. In addition, costly extra equipment is required. Other combinations of primary and secondary power stations exist.

Air separation. By separating the air that goes into the combustion installation into oxygen and nitrogen, circulating $CO_2$ can be used as a propellant gas in a power plant. Without nitrogen to dilute the $CO_2$ formed, the $CO_2$ in the exhaust gas will have a relatively high partial pressure, approximately up to 1 bar. Excess $CO_2$ from the combustion can then be separated out relatively simply so that the installation for collection of $CO_2$ can be simplified. However the total costs for such a system becomes relatively high, as one must have a substantial plant for production of oxygen in addition to the power plant. Production and combustion of pure oxygen represent considerable safety challenges, in addition to great demands on the material. This will also most likely require development of new turbines.

Conversion of the fuel. Hydrocarbon fuels are converted (reformed) to hydrogen and $CO_2$ in pressurized processing units called reformers. The product from the reformers contains $CO_2$ with a high partial pressure so that $CO_2$ can be separated out and deposited or used in another way. Hydrogen is used as fuel. The total plant becomes complicated and expensive, as it comprises a hydrogen-generating plant and a power plant.

A common feature of the alternative methods for capture of $CO_2$ from a power plant is that they strive for a high partial pressure of $CO_2$ in the processing units where the cleaning is carried out. In addition, alternative methods are characterized by long-term, expensive and risky developments, with a typical time frame of 15 years research and a further 5 to 10 years or more before operating experience is attained. Expected electrical efficiency is up to 56 to 58% for a plant without cleaning and probably, somewhat optimistically, 45 to 50% with cleaning.

An extended time frame is environmentally very undesirable. In a United Nations Economic Commission for Europe (UNECE) conference in the autumn of 2002, "an urgent need to address the continuing exponential rise in global $CO_2$ emissions" was emphasised and words such as "as soon as possible" and "need to go far beyond Kyoto protocol targets" were used.

Thus there is a need for plants that overcome the mentioned problems, having the following characteristics:

Realizable without long-term development, preferably with the use of rotary equipment that has already been tested out.

Adapted for a sufficient partial pressure of $CO_2$ so that conventional absorption installations can be used effectively, which means partial pressures up to 1.5 bara.

Lowest possible gas stream volume where $CO_2$ shall be captured, relative to the power produced Partial pressure of oxygen down to or preferably below 0.2 bara where $CO_2$ shall be captured for thereby to minimize the degradation of the absorption agent.

Possibility for effective cleaning of NOx, which is typically carried out in the temperature range 300 to 400° C. Cleaning in a pressurized system is optimal.

Efficiency in line with competing systems.

Possibility for large installations above 400 MW.

No use of reformers, processes for production of oxygen, processes for conversion of the fuel or rotating equipment that does not contribute to the net power output.

Compact and robust plant to benefit from the cost advantages by building the plant at shipyards on floating constructions. This also makes use at offshore installations possible.

SUMMARY OF THE INVENTION

According to a first aspect, the present invention relates to a method for separation of $CO_2$ from the combustion gas from a thermal power plant fired with fossil fuel, the method comprising the following steps;

a) cooling and mixing the combustion gas from the thermal power plant with air;

b) compressing the combustion gas—air mixture;

c) reheating the compressed gas from step b) by using it as an oxygen containing gas for combustion of natural gas in a pressurized combustion chamber to form an exhaust gas;

d) regulating the supply of natural gas and oxygen containing gas in the combustion chamber so that the exhaust gas contains less than 6% rest oxygen;

e) keeping the temperature in the exhaust gas between 700 and 900° C. by generation of steam in tubular coils in the combustion chamber;

f) cooling the exhaust gas and bringing it in contact with an absorbent absorbing $CO_2$ from the exhaust gas to form a low $CO_2$ stream and an absorbent with absorbed $CO_2$;

g) heating the low $CO_2$ stream by means of heat exchanges against the hot exhaust gas leaving the combustion chamber; and h) expanding the heated low $CO_2$ stream in turbines.

The air added in step a) has two purposes. Firstly, the compressors in step b) requires a constant volume of incoming gas. Accordingly, the air has a purpose as a "make up gas" to adjust the total volume of gas entering the compressors. Secondly, the oxygen in the air is used to increase and regulate oxygen content in the pressurized combustion chamber to optimize the combustion.

The absorbent used in step f) with absorbed $CO_2$ is preferably regenerated to form a $CO_2$ rich stream and regenerated absorbent.

The steam generated for cooling the combustion chamber in step e) is preferably expanded in turbines to generate power.

According to a second aspect the present invention relates to a separation plant for separation of the combustion gas from a thermal power plant into a $CO_2$ poor stream and a $CO_2$ rich stream, the plant comprising an air/combustion gas mixer, a combustion chamber for further combustion of the mixture of air and combustion gas from the power plant, a supply line (9) for supply of hydrocarbon fuel to the combustion chamber, means for cooling the exhaust gas from the combustion chamber, a contact device for bringing the cooled exhaust gas in contact with an absorbent for absorption of $CO_2$ where a $CO_2$ poor stream, that is released into the atmosphere, is generated, a regeneration loop for regeneration of the absorbent and generation of a $CO_2$ rich stream, and an associated power plant producing power from the heat produced in the combustion chamber.

Preferably, the separation plant additionally comprises compressor(s) for compressing the combustion gas from the power plant and turbine(s) for expansion of the $CO_2$ poor stream before it is released into the atmosphere. It is preferred that the absorption takes place at an elevated pressure. The combustion gas from the power plant is therefore preferably compressed before combustion in the combustion chamber of the separation plant to ascertain that the heat of compression is not lost.

According to an embodiment, the plant also comprises heat exchangers for heating the $CO_2$ poor stream by heat exchanging against the exhaust gas from the combustion chamber before the $CO_2$ poor stream is expanded over turbine(s). Heating the exhaust gas increases the energy yield from the plant and thus reduces the heat loss in the system.

According to another embodiment, the plant additionally comprises lines for transferring heat as hot water or steam between the power plant and the separation plant.

According to a third aspect, the present invention relates to a combined thermal power plant and separation plant for separation of the combustion gas from the thermal power plant in a $CO_2$ rich and a $CO_2$ poor fraction, comprising a thermal power plant fired by carbon or a hydrocarbon and a separation plant for separation of the combustion gas from a thermal power plant into a $CO_2$ poor stream and a $CO_2$ rich stream, the plant comprising an air/combustion gas mixer, a combustion chamber for further combustion of the mixture of air and combustion gas from the power plant, a supply line (9) for supply of hydrocarbon fuel to the combustion chamber, means for cooling the exhaust gas from the combustion chamber, a contact device for bringing the cooled exhaust gas in contact with an absorbent for absorption of $CO_2$ where a $CO_2$ poor stream, that is released into the atmosphere, is generated, a regeneration loop for regeneration of the absorbent and generation of a $CO_2$ rich stream, and an associated power plant producing power from the heat produced in the combustion chamber.

Preferably, the power plant is fired by a hydrocarbon, preferably by natural gas.

Preferably, the power plant is fired by a hydrocarbon, preferably by natural gas.

BRIEF DESCRIPTION OF THE DRAWINGS

The present invention will now be explained in more detail with reference to preferred embodiments and the enclosed figures, in which.

DETAILED DESCRIPTIONS OF THE PREFERRED EMBODIMENT

Figure 1:
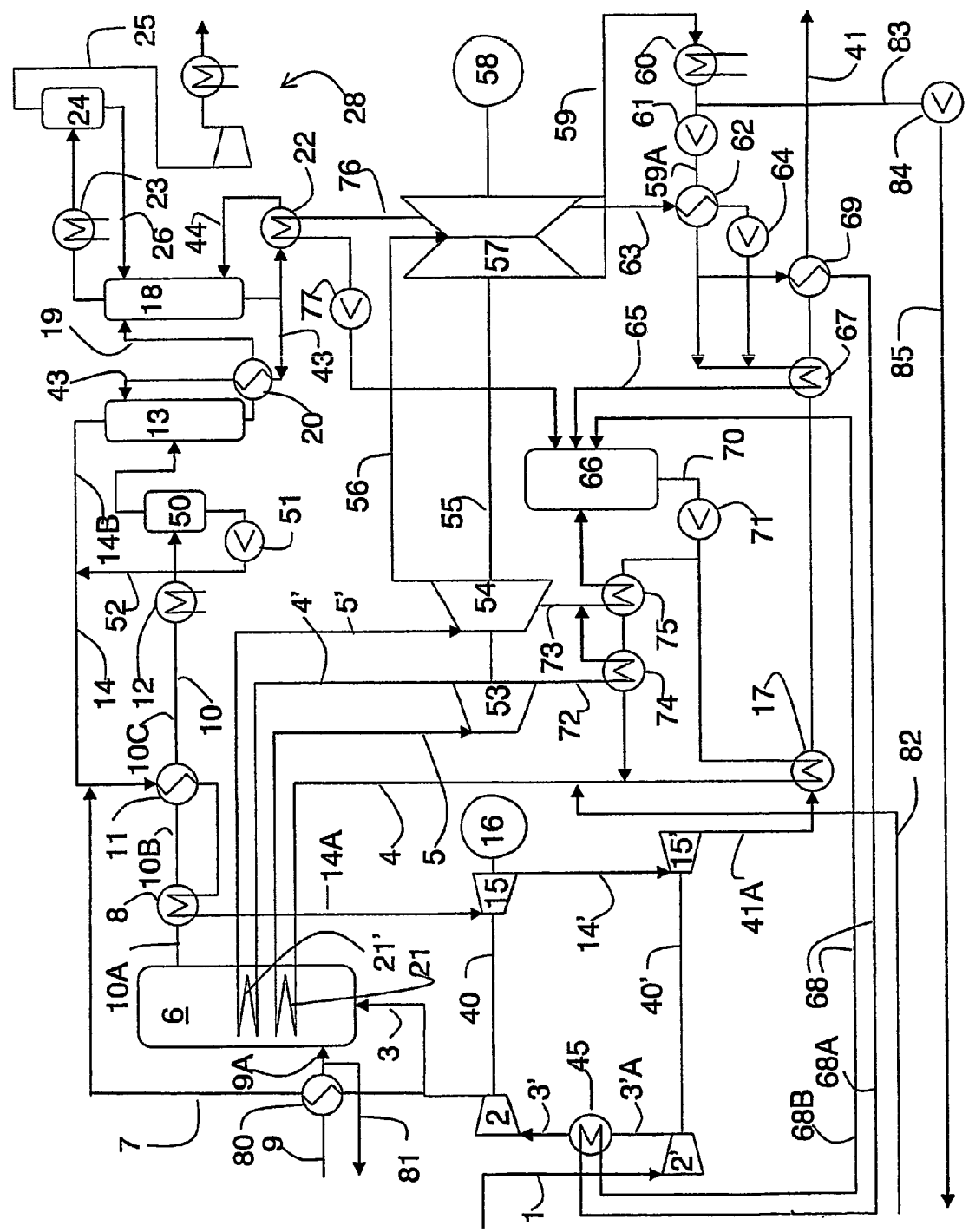
FIG. 1 is a simplified flow diagram that shows a basic embodiment of a combined plant for thermal power production and $CO_2$ removal for combination with a thermal gas power plant.

A basic configuration for a combined plant for thermal power production and $CO_2$ removal, according to the present invention, is illustrated in FIG. 1, and will be described first.

Figure 2:
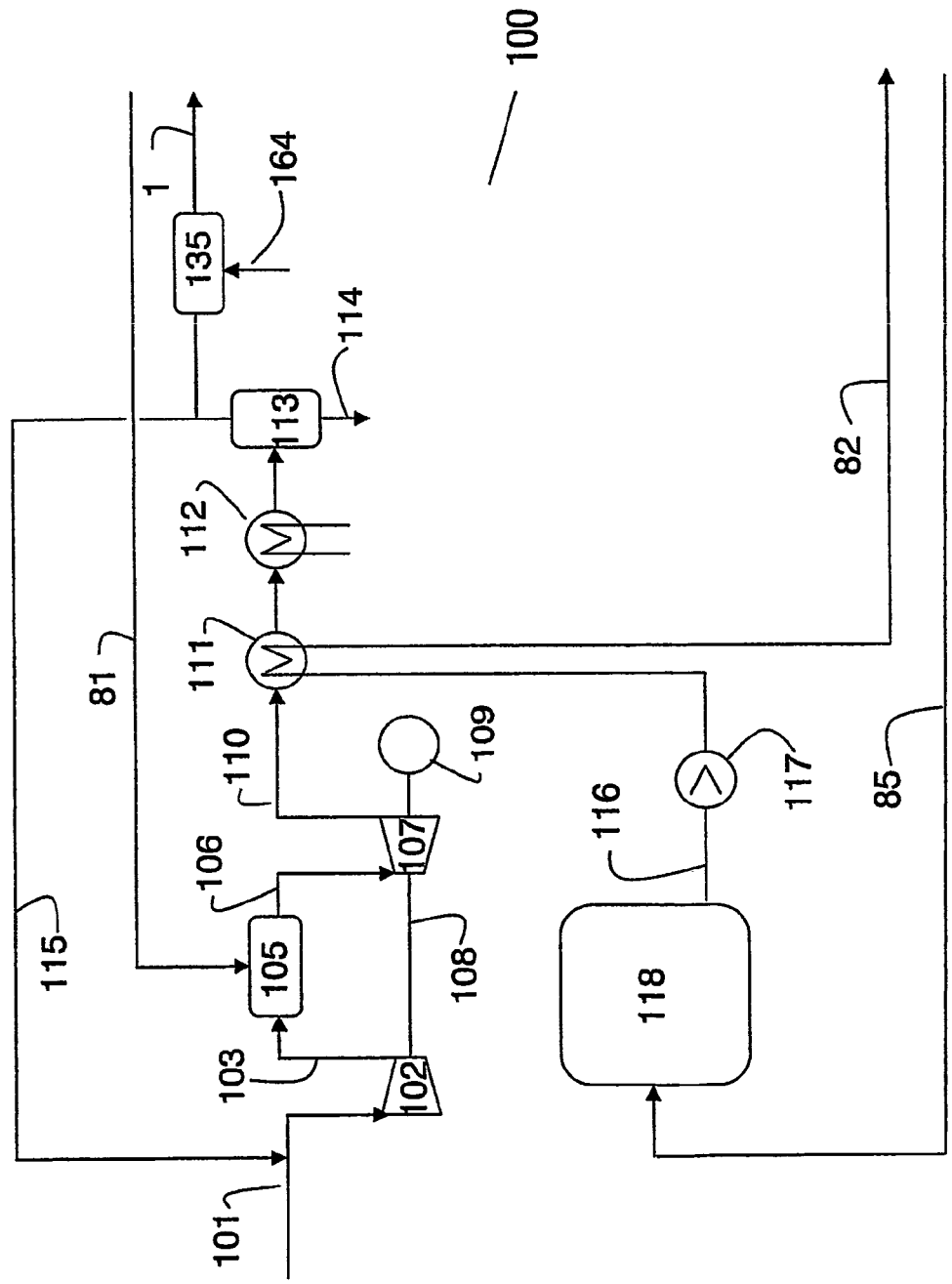
FIG. 2 is a simplified flow diagram showing a gas power plant to be coupled with the plant according to FIG. 1.
Figure 3:
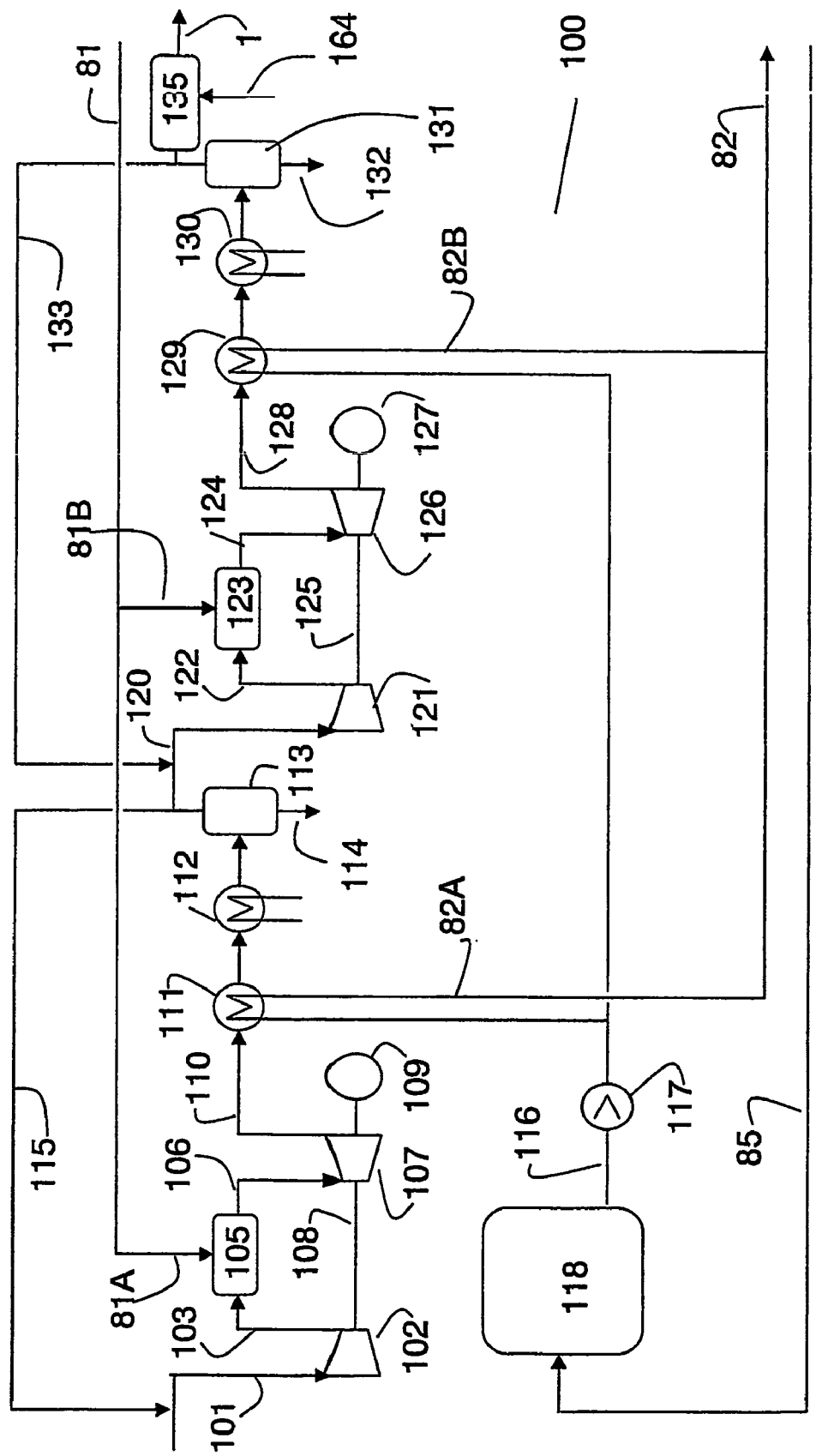
FIG. 3 is a simplified flow diagram showing an alternative gas power plant to be coupled with the plant according to FIG. 1.
Figure 5:
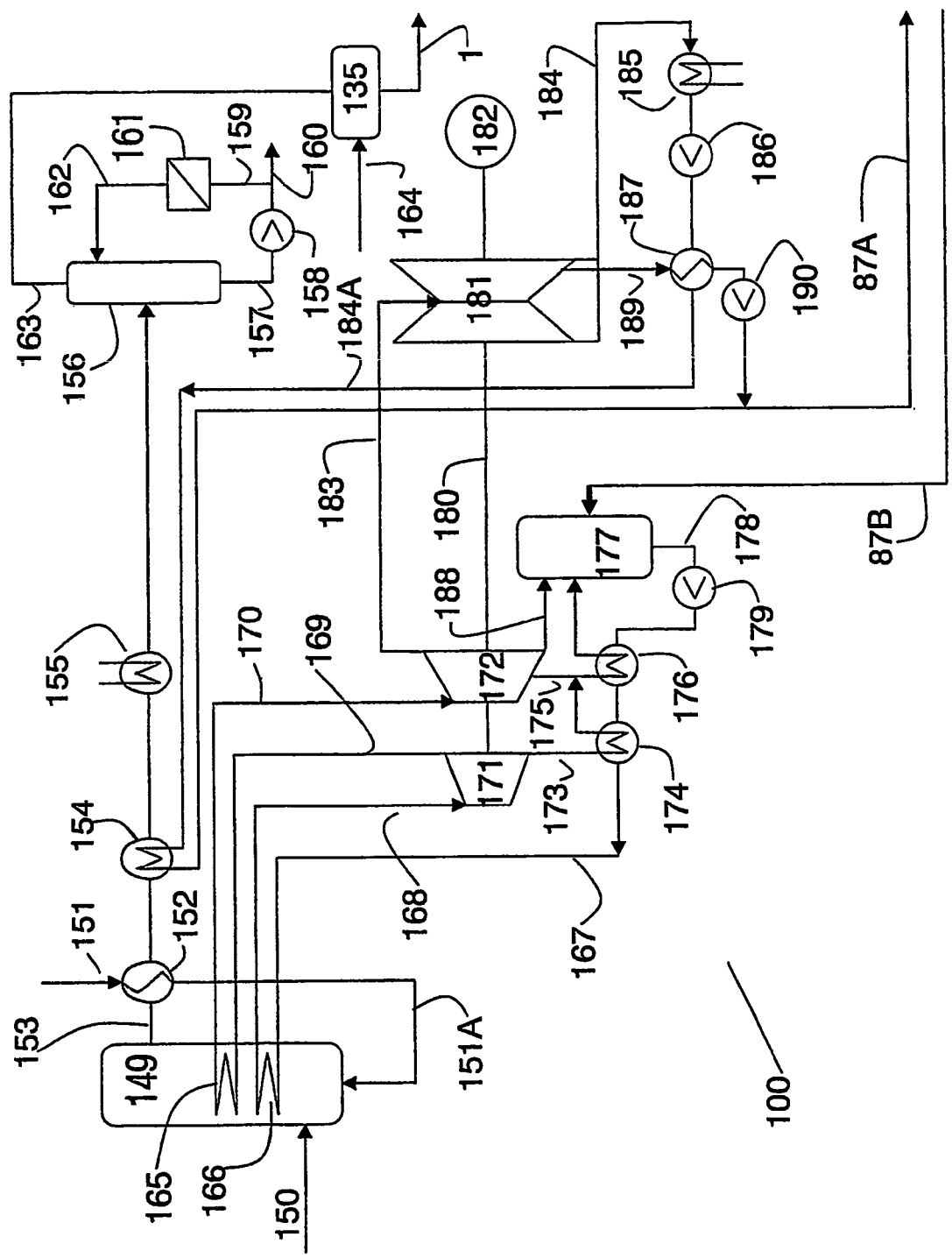
FIG. 5 is a simplified diagram showing a coal power plant to be coupled with the plant according to FIG. 4.

The combined plant for thermal power production and $CO_2$ removal receives flue gas from a power plant, for example one of the power plants illustrated in FIG. 2, 3 or 5 through a line 1. Three different power plants 100 combined with the combined plant for thermal power production and $CO_2$ removal are described in the following examples 1, 2 and 3.

The flue gas from the power plant 100 comprises a mixture of oxygen, $CO_2$, $H_2O$ and nitrogen. Typically, the flue gas from a thermal power plant based on gas turbine(s) has a rest oxygen content of about 10 to 14 vol % depending on flue gas recirculation, whereas a coal based thermal power plant wherein the combustion occurs in a combustion chamber has a rest oxygen content of about 6 to 10 vol % or lower.

The flue gas from the power plant 100 is in the following description and patent claims referred to as "flue gas".

The flue gas enters the plant through line 1, optionally together with extra air to increase the oxygen content in the flue gas, and is compressed in a compressor 2,2'. Air may be added to the flue gas from the power plant to give the compressor 2 optimum operating conditions, and/or to provide extra oxygen such that an optimum amount of heat can be produced in combustion chamber 6. The compressor 2,2' can be in one stage, but it is preferred that the compressor 2 is two or more compressors in series, preferably with intermediate cooling of the air between the compressors 2 and 2' as shown by a heat exchanger 45 that cools the first exhaust gas in line 3' between the two compressors. Two compressors, 2,2', as shown in FIG. 1, are preferred at the favored working pressure for the present invention which lies around 12 to 16 bar. The incoming flue gas is compressed in the compressor 2' to around 4 bar. The flue gas is led from compressor 2' to compressor 2 by way of a line 3'. The flue gas in the line 3' is cooled in a heat exchanger 45 between the compressors before it is led into compressor 2. In compressor 2 the flue gas is further compressed to a pressure of around 12 bar.

From compressor 2 the compressed flue gas is split in two. Most of the compressed flue gas is led by way of a line 3 to a combustion chamber 6. The rest, less than 10%, is bypassed the combustion chamber 6 through line 7. The pressure of the flue gas is determined by the compressor characteristics, and drops slightly through combustion chamber 6, heat exchangers 8, 11, trim cooler 12 and purification unit 13. The total pressure drop through this system to turbine 15 is in the order of 1 to 2 bar. Much of this pressure drop occurs in the hot heat exchanger 8, in particular if the temperature of stream 14A is above about 800° C. Heat exchanger 8, or the warmest part of heat exchanger 8 may therefore be replaced by a not shown gas-fired afterburner in line 14A. The gas-fired afterburner may be supplied with compressed flue gas from compressor 2 as an oxygen containing gas.

Fuel containing carbon or carbon compounds, such as for example hydrocarbons such as gas or oil, are fed to the combustion chamber 6 through fuel supply 9. The fuel gas may be preheated before it is introduced into the combustion chamber. The fuel gas may be preheated in a heat exchanger 80 against a part of the hot compressed flue gas taken out of the compressor 2. The cooled flue gas is thereafter led to other purposes through a line 7. The fuel gas may alternatively be heated using warm water from any available source.

Fuel that shall go into the combustion chamber 6 is pressurized by a pump (not shown) or the like to a pressure that permits the fuel to be forced into the combustion chamber. Thus, the pressure here must lie above the working pressure in the combustion chamber by, for example 0.5 to 1 bar, such as 0.7 bar.

Use of burners that give a low $NO_x$ content in the exhaust gas are preferred due to the environmentally alarming aspects of releasing such gases. With the use of such burners, NOx from a boiler with low NOx burners will typically be reduced to below 50 ppm. According to known and tested technology, further NOx can be removed with $NH_3$ ($3NO+2NH_3=2.5 N_2+3H_2O$) in a cleaning unit (not shown). This cleaning has up to 90% efficiency at atmospheric pressure, but is assumed to be much better at the working pressure which is typically above 10 bara. It will therefore be possible to clean NOx down to a residual content of 5 ppm or better. By adapting the heat exchangers, the gas can be given a temperature that is optimal for this process. Other methods without $NH_3$ also exist. The $NH_3$ method gives some $NH_3$ "slip".

Downstream of the $NO_x$ cleaning unit, it is possible to use a not shown scrubber that, by means of circulating water, saturates the gas with water vapor and at the same time removes $NH_3$ and other contaminants from the exhaust gas. Downstream of this scrubber it is possible to employ, in a not illustrated way, a cooling unit where the gas is brought in contact with water. This causes water vapour from the combustion process to condense. The water in the condensation unit is therefore heated. The warm water is used to re-heat and re-humidify the purified gas in a humidification unit located downstream of the CO2 absorption system, after the exit from absorption tower 13.

The combustion in the combustion chamber 6 occurs at a pressure from atmospheric pressure to an overpressure, such as from 1.5 to 30 bar, for example from 5 to 25 bar, such as from 10 to 20 bar. A pressure of around 12 to 16 bar has been found to be particularly preferred from the demands of the subsequent cleaning and separation of $CO_2$ and operation experience from gas turbines and air compressors. It is preferred with a combustion pressure of around 12 to 16 bar which is used in the example presented here.

The supply of oxygen-containing flue gas and optionally additional air and fuel is controlled such that the exhaust gas from the combustion chamber has a residual content of oxygen from 1 to 6% and more preferably from 1-2%.

In the combustion chamber 6, water that is supplied through the water supply 4, is heated in heating coils 21 to produce steam which is fed to, by way of a steam outlet 5, and expanded over a high pressure turbine 53. The expanded steam from the high pressure turbine 53 is thereafter led by way of a supply 4' to the combustion chamber 6 to be heated up again in a another set of heating coils 21'. The re-heated steam leaves the combustion chamber in a line 5' where it is led to a medium pressure turbine 54 where it is expanded.

From the steam turbine 54, the steam is led in a line 56 to a low-pressure turbine 57 where it is expanded further. The steam turbines 53, 54 and the low-pressure turbine 57 are preferably arranged on a common shaft 55 that drives a generator 58 for generation of electric energy. For smaller systems, steam turbines 54 and 57 may be combined into a single unit.

Most of the expanded steam/condensed water is led from the low-pressure turbine 57 by way of a line 59 to a heat exchanger 60 which cools the water further with external cooling water. After cooling/complete condensation, the water in line 59 is pumped up to the desired pressure for further circulation with the aid of a pump 61. This relatively cold water can be used to take care of low temperature energy at various locations in the plant in that it is heat exchanged with warmer streams which are to be cooled. This makes it possible to utilize/take care of low temperature heat energy, something which is essential for good energy economics and also reduces the external cooling water requirements.

This is illustrated here by a heat exchanger 62 which heat exchanges the cold stream in line 59 with a warmer stream in line 63. The stream in line 63 is a stream which is taken from the low-pressure turbine at a point where the steam is not completely expanded. The stream in line 63 is again pumped up to desired pressure in the further circulation with the aid of a pump 64. The streams in lines 59 and 63 are brought together in a line 65 which is heat exchanged with the exhaust gas from the combustion in an exhaust gas line 41, in a heat exchanger 67 to take care of residual heat before the water is led into a combined water tank and deaerator 66.

A part stream of the cooled water in line 59 can be taken out in a line 68 and heated up by heat exchange possibly initially with the partially cooled exhaust gas in line 41 in a heat exchanger 69 and thereafter with the hot air in line 3' in a heat exchanger 45 before the water in line 68 is led into the water tank 66. It is also possible to use water from line 59 as cooling water for trim cooler 12 and for interstage cooling of compressor system 28.

From the water tank 66 the water is led by way of a line 70 to a pump 71 where the water is pumped to a desired pressure. From the pump 71, the water is led in line 70 to a heat exchanger 17 where the water is heated up by heat exchange with the warm exhaust gas in line 41. It may be desirable to take out smaller streams from the steam turbines 53 and 54 in lines 72 and 73, respectively, and heat exchange these streams with a side stream of the stream in line 70, and use these for heating of the water in heat exchangers 74 and 75. Heated water from the heat exchangers 17 and 74, respectively, is led into line 4 and in for cooling of the combustion chamber.

The gas in the combustion chamber 6 is cooled by this production of steam so that the working temperature in the combustion chamber is kept in the area 700 to 900° C., typically in the area 800 to 850° C. Preferably more than 50%, more preferred more than 60%, most preferred more than 70% of the heat energy from the combustion in the combustion chamber is taken out as hot steam in the cooling of the combustion chamber.

The very large amount of heat which is removed from the combustion chamber ensures that most of the oxygen in the flue gas can be used without the temperature becoming unacceptably high. This gives a high concentration of $CO_2$ in the exhaust gas, consumption of relatively small amounts of air in relation to the amount of energy which is produced, and thereby the essential advantage that a relatively small volume stream of exhaust gas will have to be cleaned. When most of the electric energy is produced in efficient steam turbines, the heat load on the critical gas-gas heat exchangers 8 and 11 is considerably reduced, something which gives reduced dimensions and simpler construction. The low temperature and reduced heat load also means that one has fewer problems with heat expansion and corrosion than at higher temperature and heat load. Plant costs and maintenance costs can thereby be reduced, at the same time as more energy is produced and cleaning of the exhaust gas is simplified without a great loss of electrical efficiency. Further enhancement may be accomplished by reducing the temperature in stream 10A and instead replacing heat exchanger 8 or the warm inlet part of heat exchanger 8 with an afterburner.

Figure 4:
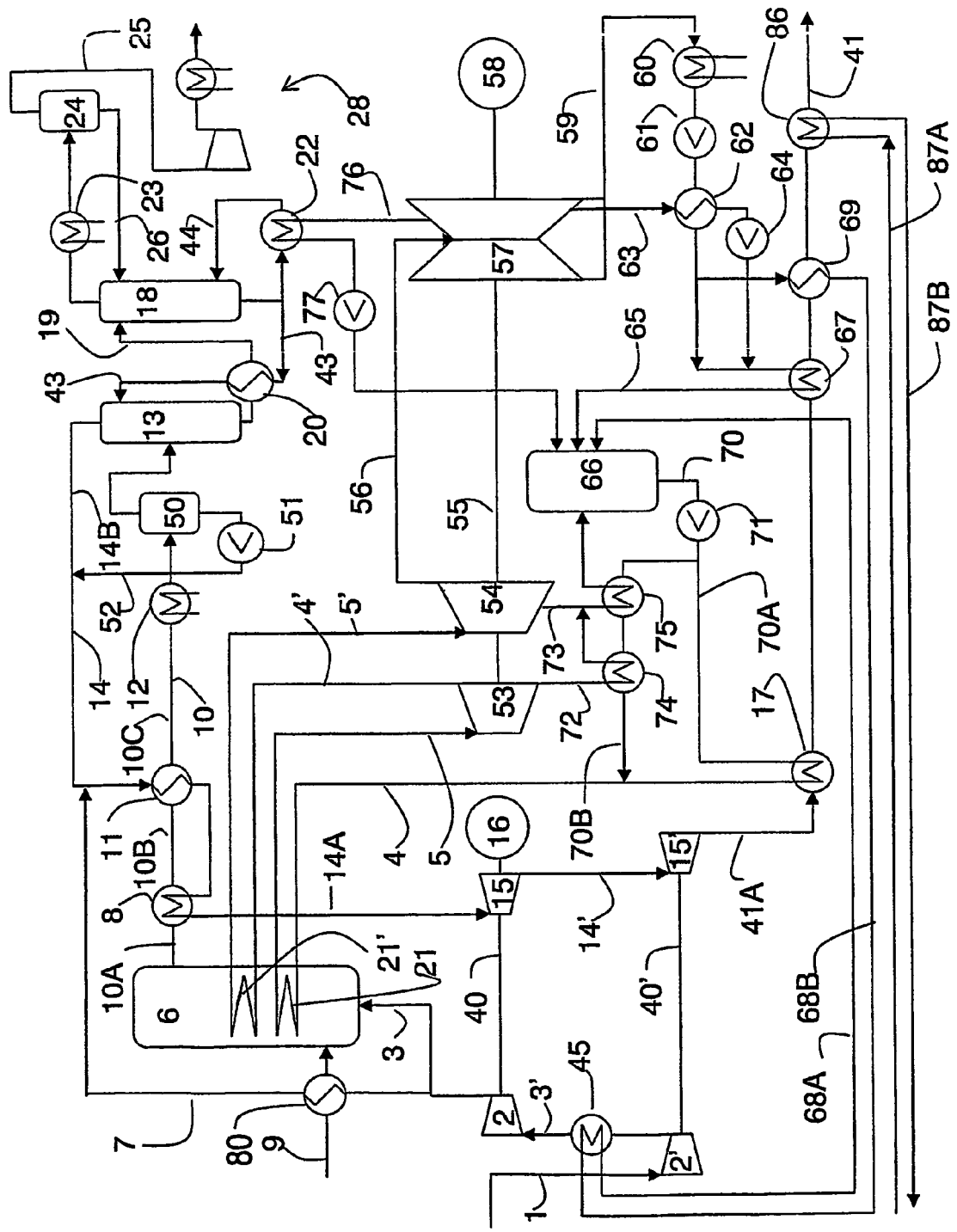
FIG. 4 is a simplified flow diagram that shows a basic embodiment of a combined plant for thermal power production and $CO_2$ removal for combination with a thermal coal power plant.

With reference to FIGS. 1 and 4, the exhaust gas from the combustion chamber 6 is led through an exhaust gas pipe 10, through one or more gas-gas heat exchangers 8, 11 and a trim cooler 12, where the exit gas is cooled before it is led into a contact device 13 where the gas is brought into contact with an absorption agent. The pressure in the contact device 13 lies close to the pressure in the combustion chamber 6 as the pressure is only reduced corresponding to the drop in pressure through the heat exchangers 8, 11 and the trim cooler 12.

Water vapour, which is a result of the combustion in the combustion chamber 6 and which is condensed during the cooling of the exhaust gas through heat exchangers, is separated in a water separator 50 before the contact device 13. Water can dilute and otherwise damage the absorption agent in the contact device.

In the enclosed figure, heat exchangers 8, 11 are two heat exchangers that are connected in series. The number of heat exchangers in series and or in parallel and the dimensioning of these are dependent on the actual dimensioning and design of an actual plant and can therefore vary from plant to plant. A typical plant will contain from two to four heat exchangers in series. The temperature in the contact device 13 is dependent on the absorption agent and is a compromise between low temperature which gives high solubility, and higher temperature which promotes reactions associated with the absorption process. Typical temperatures are below 20° C. for water, 40 to 60° C. for amines and 70 to 100° C. for use of inorganic solutions, such as potassium carbonate.

The preferred absorption agents are fluids such as water, an amine or amino acid solution or an inorganic aqueous solution such as a carbonate solution which can absorb relatively large amounts of $CO_2$ at high pressure and high partial pressure of $CO_2$. The absorption agent in the contact device 13 preferably runs down a large inner surface counter-current to the gas. It should preferably have a low volatility, a high CO2 carrying capacity and a low sensitivity to oxygen.

The contact device is preferably operated at an elevated pressure, for example above 8 bar, more preferably above 10 bar. The pressure can also be higher such as for example above 15 or 20 bar.

The gas from the exhaust gas which is not absorbed in the solvent is led from the contact device through a gas pipe 14, through heat exchangers 11, 8 where the gas is heated before it is expanded in turbine 15, 15' so that the energy is able to be used in the hot, high-pressure gas further on in the process. Entrained solvent from absorption column 13 may be removed in a not shown scrubber in line 14B, and/or in a not shown gas re-humidification unit.

Water from the water separator 50 is preferably taken out through a line 52, pumped by a pump 51 and led, together with the cleaned gas, into line 14. The water is evaporated in the heating of the cleaned gas and supplies the gas with a part of the mass, which has been removed in the condensation of water and cleaning, and thus increases the heat capacity of the gas. The heat capacity and mass of gas in the line 14 is preferably also increased by adding flue gas from line 7 as illustrated in FIGS. 1 and 4.

The efficiency can also be increased by inserting a compressor in line 14, between the contact device 13 and heat exchangers 11, 8. This compression heats the gas, a heat which can be taken out again later, and it makes it possible to permit a greater pressure drop in the heat exchangers. Thus, it is feasible to obtain a better heat transfer in a smaller area, something which makes it possible to use cheaper heat exchangers.

It can also be relevant to compensate for reduced mass flow because of the $CO_2$ which is removed, by feeding in a small compressed gas stream which is taken out of the ambient air, cool this gas down so that heat is not lost, for example by pre-heating some of the condensate from condenser 60, and lead this into the cleaned gas before the heat exchanger 11. It is preferred that the gas has about the same temperature as the gas in line 14 and cooling should therefore be rated according to this. A further alternative is to separate this air into an oxygen rich stream and an oxygen poor stream using for example membranes. The oxygen rich fraction is added to stream 1 and the oxygen poor fraction is added to stream 14. The heat capacity and mass in line 14 may also be increased by the addition of extra water obtained from the condensation of water vapour in line 41.

It is preferred that turbine 15 is more than one turbine, such as, for example two turbines, 15 and 15', connected in series, where a line 14' leads the gas which is partially expanded in turbine 15 to turbine 15'.

It can be preferable that compressor 2' and turbine 15' are arranged on a common shaft 40' and that the compressor 2' and the turbine 15' are rated so that the kinetic energy from the turbine 15' is just sufficient to drive the compressor 2'. Compressor 15 is arranged on a shaft 40 together with compressor 2 and a generator 16. The kinetic energy from turbine 15 is greater than what is required to drive the compressor 2 and the remaining kinetic energy is therefore used to produce electricity in a generator 16 which is placed on the same shaft. This kinetic energy can, if required, naturally also be used for other purposes, such as for example a re-circulation pump for the absorption agent, a re-circulation pump for boiler water, a vacuum pump, a compressor for the enriched $CO_2$, or a combination of these.

It is also possible that two or more compressor and turbine systems 2 and 15 may be arranged in parallel.

From turbine 15, the expanded exit gas from the turbine 15 is led through a heat exchanger 17 where the residual heat in the gas is used for a suitable application in the plant. In the embodiment shown, this heat is used to heat the water in line 4.

In the shown device, the solvent containing $CO_2$ is fed from the contact device 13 by way of a pipe 19, by way of a heat exchanger 20 and an expansion device (not shown) inside a desorption device 18. The pressure in the desorption device 18 is dependent on the choice of absorption agent, the amount of absorbed $CO_2$ and the demands for regeneration. The pressure will normally be lower than the pressure in the contact device 13 and will normally be between 0.2 and 1 bar above the surrounding pressure.

To increase the release of absorbed gas from the absorbent in the desorption device, a part of the absorbent will normally be removed in the bottom of the desorption device and be led through a circulation pipe 44 through a circulation heater 22, where the absorbent is heated before it is led back to the desorption device 18. Heat energy to the circulation heater 22 can be taken out from another location in the plant, for example, in that a stream of steam is taken out, at a suitable pressure and temperature, from the low-temperature turbine 57 and led in a line 76 to the heat exchanger 22 where the stream in the circulation pipe 44 is heated up by the hotter stream in line 76. The steam that has been taken out in line 76 is condensed in the heat exchanger and is pumped further to a water tank 66 by a pump 77. For example, 10 to 20 kg steam/s can be taken out in line 76 at a temperature of 200° C. and a pressure of 2.4 bar.

The energy requirement for this circulation heater is minimized as the contact device 13 is driven at a high partial pressure of $CO_2$ in the incoming gas. At the same time, the steam which is used has a low value as it is already partly expanded over high-pressure and intermediate-pressure turbines 53 and 54.

$CO_2$ rich gas which is released in the desorption device 18 is removed from the top of this and is then preferably led through a condenser 23, where it is cooled, and a liquid separator 24, before it is led through a $CO_2$ pipe 25 as a $CO_2$ rich gas stream. Liquid which is separated out in the liquid separator 24 is returned to the desorption device through a liquid-carrying pipe 26.

Regenerated absorbent from the bottom of the desorption device 18 is removed and pumped through a re-circulation pipe 43, cooled in a heat exchanger 20, and possibly further heat exchangers, before it is returned to the absorption device 13.

The $CO_2$ rich gas stream from the liquid separator 24 is led to a compressor system 28 through a $CO_2$-carrying pipe 25, said compressor system comprises a number of compression steps in which the gas is compressed in such a way that it can be stored, transported, deposited in a secure way or be sold. The components and construction of this compressor system are of a conventional type and will not be described further here. This $CO_2$ rich gas stream will typically contain from around 80-95%, and preferably more than 90%, of the total $CO_2$ from the flue gas stream 1 and from the combustion chamber 6 according to the design and control parameters of the plant.

The gas which is led out in pipe 14 from the contact device 13 has a low $CO_2$ content, typically around 10% of the total $CO_2$ from the flue gas stream 1 plus $CO_2$ produced in the combustion chamber 6. As mentioned above, this gas is supplied with water that has previously been removed from the exhaust gas in water separator 50. This water is pumped by a pump 51 through a line 52 into line 14 and the water and the gas in line 14 are thereafter heated by heat exchange with the hot exhaust gas in heat exchangers 11 and 8 before it is expanded over the turbines 15,15'.

An essential feature of the present method and device is that a substantial part of the heat energy from the combustion in the combustion chamber 6 is taken out as steam which is used to drive the steam turbines 53, 54 and 57. In that a substantial part of the heat energy is taken out as steam, a feature which is much different from conventional solutions, the temperature in the combustion chamber and consequently of the exhaust gas from the combustion chamber is moderate and adapted to the operation of the gas turbine, and the combustion chamber pressure shell is further cooled, in spite of nearly full utilization of the oxygen content of the air and thereby production of a high partial pressure of $CO_2$. This leads to considerably lower load and thereby demands on the heat exchanger 8, which would be a weak part in a plant where most of the heat energy is taken out in gas turbines driven by the exhaust gas from the combustion. This is illustrated here by table 1, which gives a few important measuring values for a plant according to the present invention.

EXAMPLE 1

$CO_2$ Removal from a One Stage Gas Power Plant

FIG. 2 illustrates a one stage thermal gas power plant 100. Natural gas is taken out from the gas inlet 9 (FIG. 1) and, after heating in heat exchanger 80, led to the power plant 100 in a line 81 and introduced into a combustion chamber 105.

Air is introduced into the system through an air intake 101, compressed in a compressor 102 and led to the combustion through a line 103. The combustion gases from the combustion chamber 105 are led through a line 106 to a gas turbine 107, where the gas is expanded. The combustion chamber 105 and line 106 are illustrated as separate units but is normally integrated in the gas turbine 107. The compressor 102, the gas turbine 107 and a generator 109 for generation of electrical power are preferably mounted on a common shaft 108.

The expanded combustion gas from the gas turbine 107 is led through a line 110 via heat exchangers illustrated by heat exchanger 111 and trim cooler 112 before the cooled combustion gas is introduced into a water separator 113. In the water separator, water produced as a result of combustion, is separated from the combustion gas and removed through a line 114. This water may be purified and used to increase the mass flow and heat capacity in line 14 on FIG. 1. The flue gas is then split into a recirculation line 115, that is introduced into the air intake 101. The recirculation, which may be up to 40% of the total flow through the turbine, allows a higher mass flow through compressor and turbine system 102 and 107, than through compressor 2 on FIG. 1. This allows the two systems to work together, and increases the overall efficiency of the system. It is also possible, and may be preferred, to operate the system without recirculation line 115. The flue gas is introduced into the combined thermal power plant and $CO_2$ removal unit as described above and illustrated in FIG. 1. The flue gas leaving the water separator 113 has a residual $O_2$ level of about 10 to 14 vol %. Preferably, air is added into the flue gas before it is introduced into the works illustrated in FIG. 1. The introduction of air including mixing of air and flue gas, is preferably carried out in a mixing box 135. The mixing box is preferably dimensioned to allow a retention period, for example 10 seconds, to assure thorough mixing of the gases and smoothen out minor variations in pressure in the gas leaving the power plant. A typical mixing box has the shape of an upright cylinder and has a total volume of about 1000 m$^3$ for a 100 MW plant, and about 4000 m$^3$ for a 400 MW plant.

Figure 6:
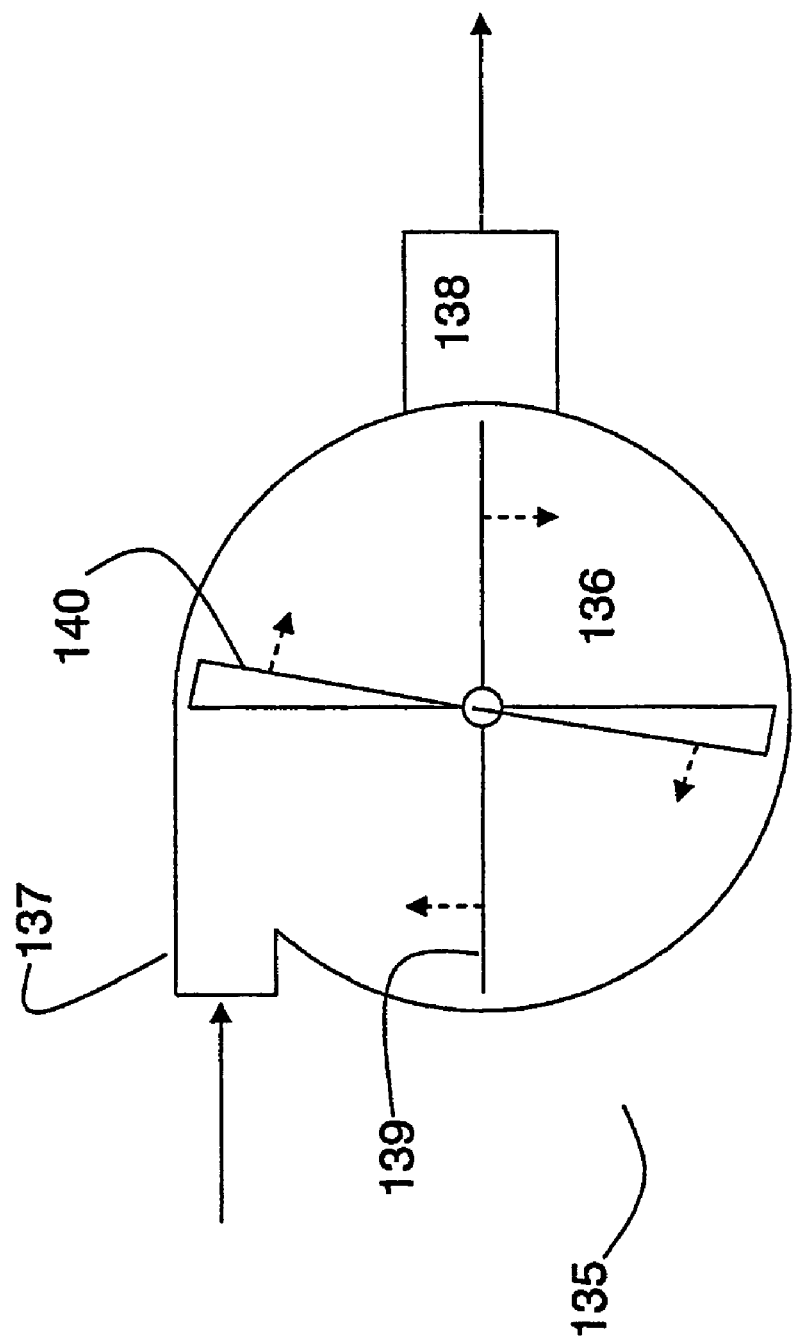
FIG. 6 is a cross section through a mixing box used in the present purification works.
Figure 7:
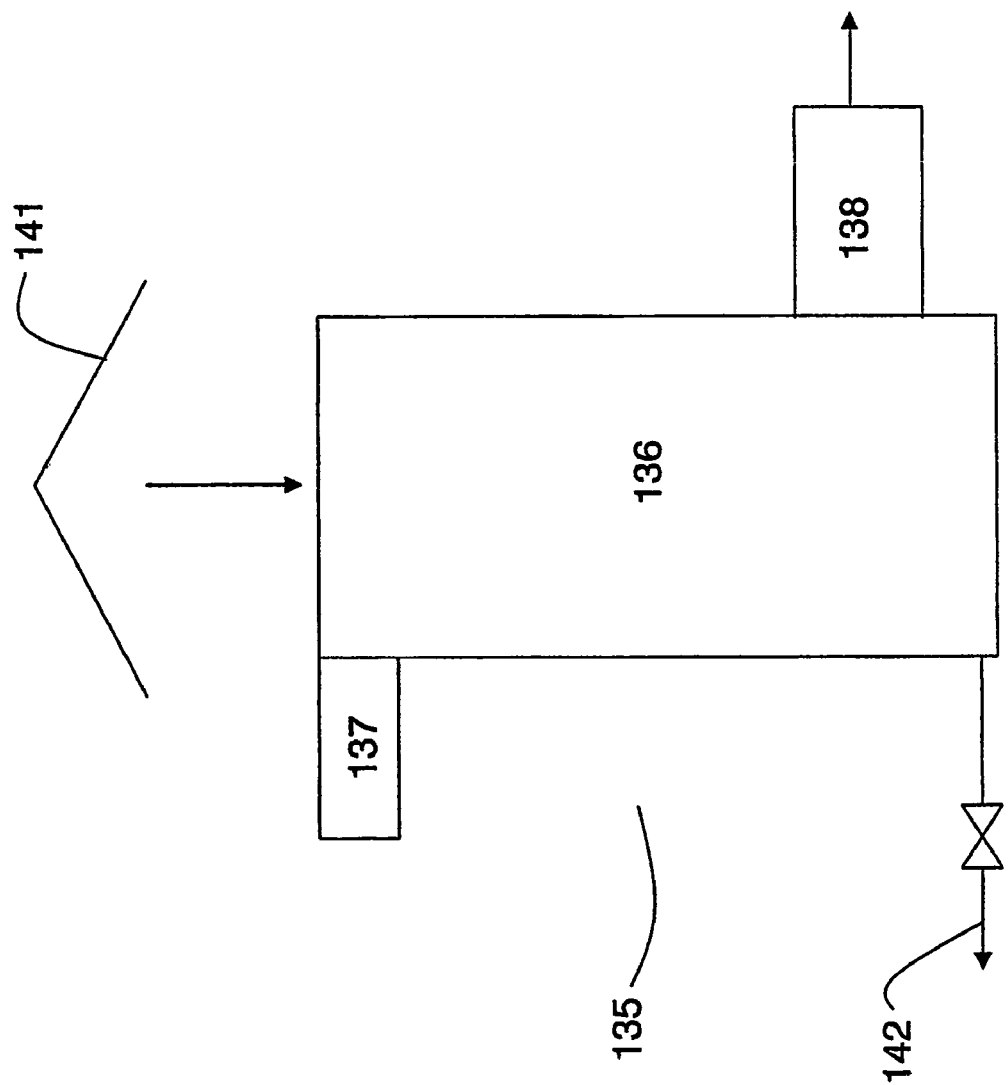
FIG. 7 is a length section through the mixing box.

FIGS. 6 and 7 illustrate a presently preferred embodiment of the mixing box. The flue gas from the power plant enters into the mixing box through an inlet 137 directing the incoming gas flow principally tangential to the circular walls of the mixing box close to the top thereof. The flue gas and air mixture leaves the mixing box in an outlet 138 close to the bottom of the mixing box. From the outlet 138 the gas mixture is introduced to line 1 in FIG. 1.

Water formed by condensation in the mixing box is removed through a water outlet 142. To improve the mixing of flue gas and air, the incoming gas flow from the power plant may impel blades 139 inserted onto the mixing tank and having an axis of rotation that mainly coincides with the length axis of the mixing tank. The blades are connected to a screw forcing the flue gas and air downwards in the mixing tank.

The mixing tank 135 has an at least partly open top allowing air to flow into the tank. To avoid rain or other matters to fall into the tank, a roof 141 may be provided at the top of the tank.

Heat in the combustion gas leaving the gas turbine 107 is used to heat water/produce steam for the steam turbines 53, 54 and/or 57 (FIG. 1). A part of the water in line 59 (FIG. 1) is taken out in a line 83 and pumped by means of a pump 85 through a line 85 into a water tank 118. The water in the tank 118 is pumped by a pump 117 through a line 116 and heated in the heat exchanger 111 by cooling the combustion gas in line 110. The hot water/steam leaving the heat exchanger 111 is led in a line 82 and introduced into water supply line 4 (FIG. 1), or alternatively directly into a superheater in combustion chamber 6 (FIG. 1) and then mixed with the high pressure steam 5. The heat exchanger 111 may consist of several heat exchangers in series, the hottest cooled by evaporation of water under high pressure, and the colder ones cooled by evaporation of water under lower pressures. The low pressure steam produced here may be superheated in boiler 6 (FIG. 1) and or used directly in steam turbines 53, 54 or 57 (FIG. 1). This increases the utilization of heat in stream 110, without problems caused by temperature cross in the heat exchangers.

Table 1 gives typical pressures, temperatures, amounts and effects at different locations in a power plant including a thermal gas power plant according to FIG. 2 and a combined thermal power plant and $CO_2$ removal unit according to FIG. 1.

TABLE 1

Pressure, temperature, amount and effect for different units/at different locations in a 100 MW plant.

| Ref. no. | Pressure (bar) | Temperature (° C.) | Amount (kg/s) | Effect (MW) |
|---|---|---|---|---|
| 1 | 1.013 | 20 | 89 | |
| 3'A | 4 | 180 | 89 | |
| 3' | 4 | 140 | 89 | |
| 3 | 12 | 300 | 79 | |
| 4 | 190 | 360 | 46 | |
| 4' | 44.5 | 350 | 46 | |
| 5 | 160 | 540 | 46 | |
| 5' | 39 | 540 | 46 | |
| 6 | 12 | | | |
| 7 | 12 | 40 | 10 | |
| 9A | 33 | 260 | 2.6 | |
| 10A | 12 | 850 | 81.6 | |
| 10C | | 78 | 81.6 | |
| 14A | | 830 | 80.6 | |
| 14B | | | 65.6 | |
| 16 | | | | 13 |
| 25 | | | 11 | |
| 41A | 1.013 | 400 | 80.6 | |
| 41 | | 85 | 80.6 | |
| 50 | 12 | 70 | | |
| 52 | | | 5 | |
| 56 | 10 | | | |
| 58 | | | | 66 |
| 59 | 0.03 | 24 | 40 | |
| 59A | | | 17 | |
| 66 | 34 | 230 | | |
| 68A | | 90 | 10 | |
| 68B | | 170 | 10 | |
| 72 | | | <0.5 | |
| 73 | | | <0.5 | |
| 76 | 2.4 | | 6 | |
| 81 | 33 | 260 | 2.1 | |
| 82 | 190 | 415 | 22 | |
| 85 | | 24 | 22 | |
| 101 | 1.013 | 15 | 90 | |
| 103 | 33 | 540 | | |
| 105 | | 1100-1200 | | |
| 106 | 33 | 1175 | | |
| 109 | | | | 43 |
| 110 | | 450 | | |
| 114 | | | 3 | |

Recirculation in line 115 in the example is 30% of the total combustion gas.

EXAMPLE 2

$CO_2$ Removal from a Two Stage Gas Power Plant

FIG. 3 illustrates a two stage thermal gas power plant. The elements corresponding to the elements described in Example 1 and illustrated in FIG. 2 have the same reference numbers and are not described again here unless regarded as necessary.

The flue gas leaving the first stage, corresponding to the thermal gas power plant in FIG. 2, is split into a recirculation line 115, as in FIG. 2, and secondary air line 120. It is also possible to omit recirculation line 115, and instead balance the flue gas rate from 113 and the volume flow requirement in line 120 by means of a not shown air inlet mixing box similar to 135. The exhaust gas from the first stage in the secondary air line 120 is introduced into the second stage, compressed in a compressor 121 and led to a combustion chamber 123 through a line 122. Natural gas in line 81 is introduced through line 81B as additional fuel into the combustion chamber 123.

The combustion gases from the combustion chamber 123 are led through a line 124 to a gas turbine 126, where the gas is expanded. The combustion chamber 123 and line 122 are illustrated as separate units but is normally integrated in the gas turbine 126. The compressor 121, the gas turbine 126 and a generator 127 for generation of electrical power are preferably mounted on a common shaft 125.

The expanded combustion gas from the gas turbine 126 is led through a line 128 via heat exchangers illustrated by heat exchanger 129 and trim cooler 130 before the cooled combustion gas is introduced into a water separator 131. In the water separator, water produced as a result of combustion, is separated from the combustion gas and removed through a line 132. The remaining flue gas is split into a recirculation line 133, and introduced into the air intake 120 and a flue gas line 1. The recirculation, which may be up to 40% of the total flow through the turbine, allows a higher mass flow through turbine systems 107 and 126, than through compressor 2 on FIG. 1. This allows the two systems to work together, and increases the overall efficiency of the system. It is also possible to omit recirculation line 133. The flue gas in the flue gas line is introduced into the combined thermal power plant and $CO_2$ removal unit as described above and illustrated in FIG. 1. The flue gas has a rest $O_2$ level of about 10 vol %. Additional air may be added into the flue gas in a mixing box 135 as described in Example 1, before the gas enters line 1.

Heat in the combustion gases leaving the gas turbines 107 and 126 are used to heat water/produce steam for the steam turbines 53, 54 and 57 (FIG. 1). A part of the water in line 59 (FIG. 1) is taken out in a line 83 and pumped by means of a pump 84 through a line 85 into a water tank 118. The water in the tank 118 is pumped by a pump 117 through a line 116, is split in two lines, one to the heat exchanger 111 in the first stage, and the other to the heat exchanger 129 in the second stage. The water is heated and steam produced in the heat exchangers 111 and 129 by cooling the combustion gases in lines 110 and 128, respectively. The hot water/steam leaving the heat exchangers 111 and 129 is led in lines 82A and 82B into line 82 and is introduced into water supply line 4 (FIG. 1). Each of the heat exchangers 111 and 129 may consist of more than one heat exchanger, for example three in series. The hottest of these are cooled by evaporation of water under high pressure, and the colder ones cooled by evaporation of water under lower pressures. The low pressure steam produced here may be superheated in boiler 6 (FIG. 1) and or used directly in steam turbines 53, 54 or 57 (FIG. 1). This increases the utilization of heat in stream 110 and 128, without causing problems related to temperature cross in the heat exchangers.

Table 2 gives typical pressures, temperatures, amounts and effects at different locations in a power plant including a thermal gas power plant according to FIG. 3 and a combined thermal power plant and $CO_2$ removal unit according to FIG. 1.

TABLE 2

Pressure, temperature, amount and effect for different units/at different locations in a 100 MW plant.

| Ref. no. | Pressure (bar) | Temperature (° C.) | Amount (kg/s) | Effect (MW) |
| --- | --- | --- | --- | --- |
| 1 | 1.013 | 20 | 88 | |
| 3'A | 4 | 180 | 88 | |
| 3' | 4 | 140 | 88 | |
| 3 | 12 | 300 | 78 | |
| 4 | 190 | 360 | 48 | |
| 4' | 39 | 275 | 48 | |
| 5 | 160 | 460 | 48 | |
| 5' | 39 | 460 | 48 | |
| 6 | 12 | | | |
| 7 | 12 | 40 | 10 | |
| 9A | 33 | 260 | 2.3 | |
| 10A | 12 | 850 | 80.3 | |
| 10C | | 78 | 80.3 | |
| 14A | | 830 | 79 | |
| 14B | | | 64.3 | |
| 16 | | | | 12.5 |
| 25 | | | 11.4 | |
| 41A | 1.013 | 400 | 79 | |
| 41 | | 190 | 79 | |
| 50 | 12 | 70 | | |
| 52 | | | 4.6 | |
| 56 | 10 | | | |
| 58 | | | | 62 |
| 59 | 0.03 | 24 | 42 | |
| 66 | 34 | 200 | | |
| 68A | | 69 | 7 | |
| 68B | | 175 | 7 | |
| 72 | | | <0.5 | |
| 73 | | | <0.5 | |
| 76 | 2.4 | | 6 | |
| 81 | 33 | 260 | 2.8 | |
| 81A | 33 | 260 | 1.45 | |
| 81B | 33 | 260 | 1.35 | |
| 82 | 190 | 380 | 31.4 | |
| 82A | 190 | 380 | 15 | |
| 82B | 190 | 380 | 16.4 | |
| 85 | | 24 | 31.4 | |
| 101 | 1.013 | 15 | 90 | |
| 103 | 33 | 540 | 90 | |
| 105 | | 1100-1200 | | |
| 106 | 33 | 1155 | | |
| 109 | | | | 29 |
| 110 | | 435 | | |
| 114 | | | 1.8 | |
| 120 | 1 | 20 | 89.65 | |
| 122 | 33 | | 89.65 | |
| 123 | 33 | 1100-1200 | 91 | |
| 124 | 33 | 1113 | 91 | |
| 127 | | | | 26 |
| 128 | 1 | 420 | 91 | |
| 132 | 1 | 20 | 2.8 | |

Recirculation of the total combustion gases in lines 115 and 133 is 0% in the example.

EXAMPLE 3

$CO_2$ Removal from a Thermal Coal Fired Power Plant

An exemplary plant is illustrated in FIGS. 4 and 5. FIG. 4 illustrates a combined thermal gas power plant and $CO_2$ removal unit, and FIG. 5 illustrates a coal fired thermal power plant to be coupled with the plant at FIG. 4.

The plant according to FIG. 4 corresponds to the plant of FIG. 1 wherein lines 81, 82, 83, 85 and the pump 84 are removed and lines 87A and 87B and a heat exchanger 86 is inserted. The heat exchanger 86 heats incoming water in line 87A and cools the exhaust gas in line 41. The heated water leaves the heat exchanger in line 87B.

Carbon fuel is introduced from a coal line 150 into a combustion chamber 149 wherein the coal is combusted by introduction of air from a air feed line 151. The air in the air feed line is preferably preheated by heat exchanging in a heat exchanger 152 against the hot combustion gas leaving the combustion chamber 149 in combustion line 153.

The combustion gases leaving the heat exchanger 152 are additionally cooled in a heat exchanger 154 and a trim cooler 155 before the combustion gases are introduced into a scrubber 156 where the gas is scrubbed with water for removal of solids and dust. The scrubbed flue gas leaves the scrubber through a flue gas line 1 and introduced to the plant illustrated in FIG. 4. Additionally air is preferably introduced into line 1 from an air feed line 164 to increase the percentage of $O_2$ in the line 1. The flue gas in flue gas line 1 is used as oxygen containing gas in line 1 in FIG. 4. Additionally, air may be added into the flue gas in a mixing box 135 as described in Example 1.

Water for scrubbing of the flue gas is removed from the scrubber 156 in a line 157 together with the solids and dust removed from the gas, pumped by means of a pump 158 through a line 159 and filtered in a filter unit 161 before the water is reintroduced into the scrubber through a line 162. Surplus water, resulting from the combustion in the combustion chamber, is removed from the recirculation in a line 160.

The combustion chamber is cooled down by production of hot water and steam in heating coils 165, 166 in the combustion chamber. Water for production of hot water and steam is taken out from a water tank 177 though a line 178, pumped by a pump 179 via heat exchangers 174, 176 and led by means of a line 167 to the first heating coil 166 where steam is produced.

Steam leaving the heat coil 166 through a line 168 is expanded in a steam turbine 171. The expanded steam is returned through a line 169 to the second heat coil 165 inside the combustion chamber 149 where it is reheated. The reheated steam leaves the heating coil 165 in a line 170 leading the steam to a second steam turbine 172 where the steam is expanded again. The expanded steam from steam turbine 172 is led through a line 183 to a steam turbine 181 where the steam is expanded further.

A minor part of the steam from the steam turbine 172 is led through a line 188 directly into the water tank 177 to give the correct mass balance in the system. The amount is sufficient to keep the temperature at the boiling point, plus a small extra flow to remove volatile gases from the boiler water, although such extra flow is not shown in Tables 1, 2 or 3.

The steam turbines 171, 172 and 181 are preferably mounted on a common shaft 180 that are powering a generator 182 for generation of electricity. Fully expanded steam/water is withdrawn from the turbine 181 through a line 184, whereas some partly expanded water/steam is withdrawn from the turbine in a line 189.

The water vapor in line 184 is condensed in a heat exchanger 185 receiving cooling water from a suitable source. The condensate is then pumped by means of a pump 186 and heated in a heat exchanger 187 against the partly expanded steam/water in line 189. The partly heated water is thereafter heated further in heat exchanger 154, where it is heat exchanged against the partly cooled combustion gas in line 153 before it is led in a line 87A to the heat exchanger 86 (FIG. 4). The hot water/steam withdrawn from the turbine 181 in line 189 is pumped by means of a pump 190 into line 87A after leaving the heat exchanger 187.

The water in line 87A that has been heated in heat exchanger 86 is returned into the water tank in line 87B.

Heat exchanges 174 and 176 receive steam from turbine 171 via a line 173, respectively turbine 172 via line 175. The steam in lines 173 and 175 is after cooling and condensation in the heat exchangers 174 and 176 led to the water tank 177.

Table 3 gives typical pressures, temperatures, amounts and effects at different locations in a power plant including a thermal coal power plant according to FIG. 5 and a combined thermal power plant and $CO_2$ removal unit according to FIG. 4.

TABLE 3

Pressure, temperature, amount and effect for different units/at different locations in a 100 MW plant.

| Ref. no. | Pressure (bar) | Temperature (° C.) | Amount (kg/s) | Effect (MW) | Composition vol % |
|---|---|---|---|---|---|
| 1 | 1.013 | 20 | 91 | | 12 ($O_2$) |
| | | | | | 5 ($CO_2$) |
| 3 | 12 | 300 | 83 | | |
| 4 | 190 | 315 | 27 | | |
| 4' | 45 | 330 | 26 | | |
| 5 | 180 | 540 | 27 | | |
| 5' | 39 | 540 | 26 | | |
| 7 | 12 | | 8 | | |
| 9 | 12 | 15 | 2.5 | | |
| 10A | 12 | 870 | 85 | | |
| 14A | 11 | 845 | 82 | | |
| 14B | 11.5 | 70 | 68 | | |
| 16 | | | | 13 | |
| 25 | | | 11.3 | | 100 ($CO_2$) |
| 41 | About 1 | 84 | 82 | | |
| 41A | About 1 | 410 | 82 | | |
| 52 | | | 5 | | |
| 56 | 10 | | 25.8 | | |
| 58 | | | | 33 | |
| 59 | 0.03 | 25 | 13.2 | | |
| 63 | 0.2 | | 0.6 | | |
| 66 | 25 | 175 | | | |
| 68A | 25 | 58 | 13.8 | | |
| 68B | 25 | 135 | 13.8 | | |
| 70A | 190 | | 4 | | |
| 70B | 190 | | 23 | | |
| 72 | 45 | 330 | 1 | | |
| 73 | | | 0.2 | | |
| 76 | 2 | 205 | 12 | | |
| 87A | 20 | 75 | 33 | | |
| 87B | 20 | 135 | 33 | | |
| 151 | 1 | 15 | 60 | | |
| 151A | 1 | 370 | 60 | | |
| 160 | | | 4 | | |
| 163 | 1 | 30 | 59 | | 8 ($O_2$) |
| | | | | | 10 ($CO_2$) |
| 164 | 1 | 15 | 32 | | 21 ($O_2$) |
| 167 | 190 | 215 | 38 | | |
| 168 | 160 | 540 | 38 | | |
| 169 | 44.5 | 350 | 37 | | |
| 170 | 39 | 540 | 37 | | |
| 173 | 44.5 | 350 | 1 | | |
| 175 | | | 1 | | |
| 177 | 20 | 175 | | | |
| 182 | | | | 55 | |
| 183 | 10 | 350 | 33 | | |
| 184 | 0.03 | 25 | 32.5 | | |
| 184A | | 33 | 32.5 | | |
| 188 | | | 3 | | |
| 189 | | 60 | 0.5 | | |

The configuration according to the figures and the described embodiments according to the present invention can be varied with respect to heat exchangers, pumps, etc, without this diverting from the inventive concept. Elements that are shown here with a symbol can be a combination of similar or different elements which together give the desired and described function. Thus, what has been illustrated as a heat exchanger can describe a combination of heat exchangers. Likewise, such a plant will be able to encompass further elements which are not described here, such as further heat exchangers to take care of smaller amounts of energy, pumps or pressure reducing valves to regulate the pressure in certain elements, etc.

Similarly, during the engineering and optimization of a particular plant, one will be able to deviate from details in the described mass and energy flow.

Line 7 can alternatively be supplied with air directly from the compressors 2, 2' or from a separate compressor (not shown).

A high-temperature heat exchanger should not be cooled down and heated up repeatedly if it shall also function as a pressure container. Therefore, it can be advantageous that hot heat exchangers, i.e. the heat exchangers in which one of the streams is above 350° C., is constructed with an outer pressure-shell and an inner shell between which flows a cooling medium, such as $CO_2$ or nitrogen, in the same way as for the combustion chamber. Alternatively, the container around the heat exchanger can be cooled directly or indirectly with boiler water as the cooling agent. A further alternative is to build the heat exchanger inside the pressurized combustion chamber, where it does not need to function as a pressure container any longer. It will also be possible to eliminate the hot heat exchanger, and instead achieve the required temperature by using a small combustion chamber immediately upstream of the expansion turbine.

It can also be relevant to carry out other specific construction adjustments on some elements, in particular to improve operating safety, reduce building costs and reduce the danger of wear and associated errors. Thus, it can be relevant to use a cooling gas such as $CO_2$ to cool the shell of the combustion chamber 6 and other hot elements such as hot heat exchangers, for example heat exchanger 8. This heat energy in this cooling gas can be used in that it is supplied to heat exchangers for heating at locations in the process where it is possible to utilize low-grade energy, in particular this concerns preheating of water to the combustion chamber. Cooling of pressurized combustion chamber and pressurized heat exchangers to a shell temperature lower than 350° C. gives the opportunity of using high tensile, low-alloy and inexpensive steel qualities. The system can also be used for heating of these elements before start-up of the plant. This reduces heat tensions and reduces the risk of cracking in pressure-shells and pipes.

It can furthermore be relevant to modify the cooling and condensation system between the combustion chamber and the $CO_2$ absorption unit to purify the gas with respect to NOx, SOx (sulfur compounds), heavy hydrocarbons that have not been oxidized in the combustion process and solid particles. Such purification is typically carried out in scrubbing units with circulating liquid such as water. Liquid supply, such as water from downstream cooling and condensation processes, saturates the gas and assures that the liquid is not removed by vaporization. A side stream from the circulating liquid carries the contaminants away from the process.

Downstream of the purification system the gas is cooled and water vapor condenses. Heat is removed by vaporization of water in the purified gas, and possibly by using a cooling agent such as external cooling water. Such heat exchange with phase change gives particular problems with respect to temperature differences between the hot and the cold side of the exchanger (pinch problems). It may be relevant to use special designs for this condensation and re-humidification process, such as a single container containing the heat exchangers. This will allow circulating water in the $CO_2$ rich gas stream where condensation occurs while at the same time removing heat. It will also allow circulating water in the $CO_2$ lean (purified) gas where vaporization or re-humidification occurs while at the same time adding heat. Circulating water improves the efficiency when water is condensed from the exhaust gas during cooling, or when water is vaporized into the purified exhaust gas that is being heated.

In addition, it may be relevant to use a scrubber with circulating liquid such as water in the gas stream immediately downstream of the $CO_2$ absorption column. This removes $CO_2$ absorbing chemicals to a very low residual level, preventing the escape of such chemicals to the atmosphere via the gas turbine system.

It may be relevant to increase the mass flow through the gas turbines by adding extra water to the exhaust gas downstream of the $CO_2$ absorption column. This water may be obtained from the expanded exhaust gas downstream of the gas turbines, after the cooling and heat recovery from this gas. The water is obtained by further cooling and condensation of water vapor in the gas. This may be accomplished in a scrubber with circulating water. Surplus heat is removed by external cooling of the circulating water using a suitable cooling agent.

The invention claimed is:

1. A method for separation of $CO_2$ from the combustion gas from a thermal power plant fired with fossil fuel, the method comprising the following steps;
    a) cooling and mixing the combustion gas from the thermal power plant with air;
    b) compressing the combustion gas—air mixture;
    c) reheating the compressed gas from step b) by using it as an oxygen containing gas for combustion of natural gas in a pressurized combustion chamber to form an exhaust gas;
    d) regulating the supply of natural gas and oxygen containing gas in the combustion chamber so that the exhaust gas contains less than 6% rest oxygen;
    e) keeping the temperature in the exhaust gas between 700 and 900° C. by generation of steam in tubular coils in the combustion chamber;
    f) cooling the exhaust gas and bringing it in contact with an absorbent absorbing $CO_2$ from the exhaust gas to form a low $CO_2$ stream and an absorbent with absorbed $CO_2$;
    g) heating the low $CO_2$ stream by means of heat exchanges against the hot exhaust gas leaving the combustion chamber; and
    h) expanding the heated low $CO_2$ stream in turbines.

2. The method according to claim 1, wherein the absorbent used in step f) with absorbed $CO_2$ is regenerated to form a $CO_2$ rich stream and regenerated absorbent.

3. The method of claim 1, wherein the steam generated for cooling the pressurized combustion chamber in step e) is expanded in turbines to generate power.

4. The method of claim 2, wherein the steam generated for cooling the pressurized combustion chamber in step e) is expanded in turbines to generate power.

* * * * *